Figure 1:
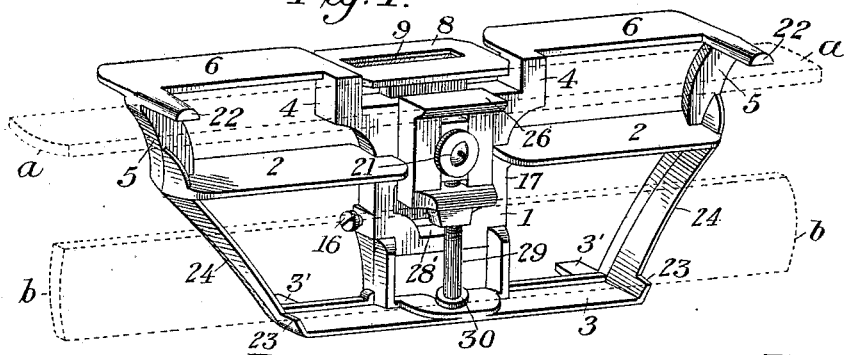

No. 672,691. Patented Apr. 23, 1901.
G. Y. ANDERSON.
SAW SHARPENING IMPLEMENT.
(Application filed Aug. 30, 1900.)
(No Model.)

Witnesses.

Inventor.
Gustaf Y. Anderson
Rexford M. Smith.
Attorney.

THE NORRIS PETERS CO., PHOTO-LITHO., WASHINGTON, D. C.

UNITED STATES PATENT OFFICE.

GUSTAF Y. ANDERSON, OF DYEA, ALASKA TERRITORY.

SAW-SHARPENING IMPLEMENT.

SPECIFICATION forming part of Letters Patent No. 672,691, dated April 23, 1901.

Application filed August 30, 1900. Serial No. 28,518. (No model.)

*To all whom it may concern:*

Be it known that I, GUSTAF Y. ANDERSON, a citizen of the United States, residing at Dyea, in the Territory of Alaska, have invented a certain new and useful Saw-Sharpening Implement, of which the following is a specification, reference being had therein to the accompanying drawings.

This invention relates to saw-sharpening implements, and is in the nature of a combined saw-jointer, straight-edge, and gage.

The present invention is in the nature of an improvement upon the construction set forth and illustrated in my prior application, Serial No. 724,519, filed July 20, 1899.

The object of the present invention is to provide in connection with the body of the implement a gage-plate and means for accurately leveling, adjusting, and securing the gage-plate with relation to the frame; also, to construct and arrange the file-clamp in such manner as to simplify and cheapen the implement and render the same more efficient in practice and easy to manipulate.

The detailed objects and advantages of the invention will appear more fully in the course of the ensuing description.

The invention consists in certain novel features and details of construction and arrangement of parts, as hereinafter fully described, illustrated in the drawings, and incorporated in the claims.

Figure 2:
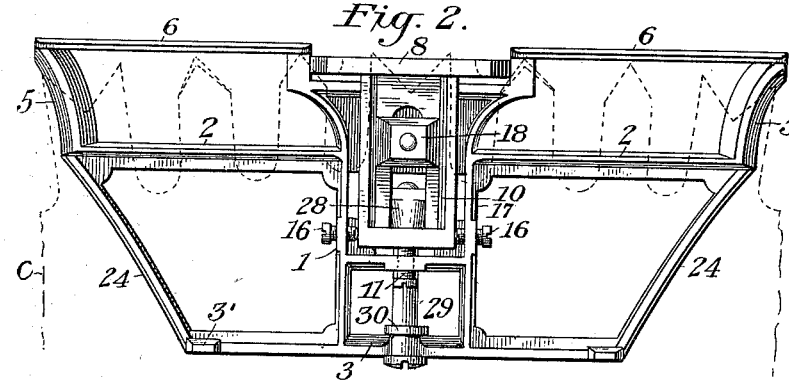
Figure 4:
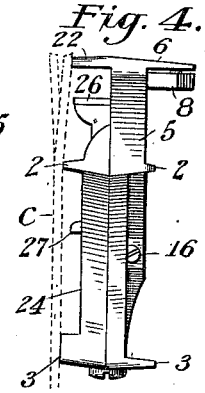
Figure 3:
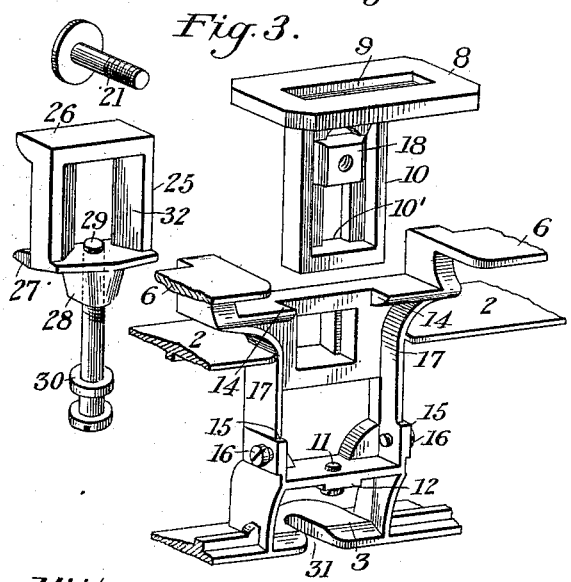
Figures 5, 6:
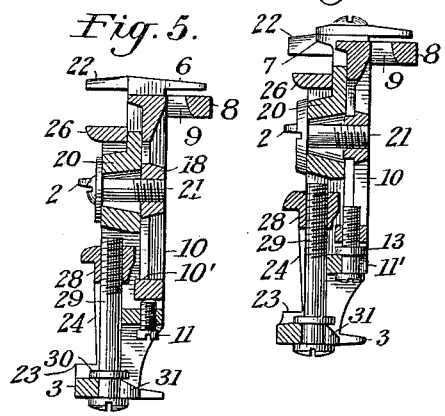

In the accompanying drawings, Figure 1 is a perspective view of a combined saw-jointer, straight-edge, and gage constructed in accordance with the present invention and showing in dotted lines a file associated therewith in two positions. Fig. 2 is a side elevation of the same looking toward the opposite side of the implement and illustrating by dotted lines the relation which the implement bears to the saw-teeth when used for gaging the rakers and for ascertaining and determining the uniform height of the cutting-teeth. Fig. 3 is a perspective view of the central portion of the implement with the parts disassociated to better illustrate the particular form of each member. Fig. 4 is an end view showing the relation between the implement and saw when used for gaging the set in the saw-teeth. Fig. 5 is a central vertical transverse section through the implement. Fig. 6 is a similar view taken on the same line, showing slight modifications.

Similar numerals of reference designate corresponding parts in the several figures of the drawings.

Referring to the drawings, 1 designates the frame or main body of the implement, from which the several flanges, lugs, and bearing-points project. Longitudinal flanges 2 and 3 are formed on both sides of the frame to support the tool in proper position against the saw-blade. Extending upward from the flanges 2 are posts 4 and 5, arranged at the extreme ends of the tool and at intermediate points, as near as practicable to the center of the implement, leaving an intervening space in front of the cutting-teeth on each side of the raker-gage when the tool is used on cross-cut-saws. Arranged over or above said spaces are overhanging flanges or plates 6, provided on their under sides with true faces and forming straight-edge sections. Said flanges or plates may either be integral with the posts 4 and 5, as shown in Figs. 1 to 5, inclusive, or they may be made separately, case-hardened, and mounted upon the bearings formed on the tops of said posts and secured thereto with screws, as shown in Fig. 6, the said screws passing through the plates 6 into screw-threaded sockets in the posts in a manner that will be readily understood. The posts are also provided at their upper extremities with laterally-projecting lips 7 to provide broader seats or rests for the plates 6, and all of said rests or seats are arranged in a true common plane. The flanges or plates 6 by reason of their having a perfectly-true longitudinal surface the full width of their inner sides will permit the saw-teeth points to be clearly viewed on a level therewith through the open spaces beneath the straight-edge thus formed, whereby the even height or length of the cutting-teeth can be easily ascertained and determined. To add to the practical value of this feature of the invention, the implement is made somewhat longer adjacent to the straight-edge, and the outer posts 5 are divergent toward their outer ends, thus increasing the length of the view-line.

Between the posts 4 is a gage-plate 8, having the usual slot 9 therein and provided with an open shank 10, extending downward at right angles to the gage-plate proper and provided at its lower end with a small projection 10' on its inner side, extending into an opening in the frame and forming an abutment or seat, against which bears the end of an adjusting-screw 11, inserted vertically through a screw-threaded opening in a lug 12, projecting laterally from the frame. Instead of arranging the screw 11 as just stated the frame may be provided with a notch 11' and the screw 11 may be placed in said notch and provided with a collar 13, which collar and the head of the screw will closely embrace the lug 12 on opposite sides, so as to prevent longitudinal movement of the screw, while the threaded shank of the screw engages a screw-threaded opening in the lower end of the shank, all as clearly illustrated in Fig. 6.

The frame is provided with two laterally-projecting guides 14 near its upper edge, and beneath said guides are two lugs 15, having horizontal screw-threaded openings in which are inserted guide-screws 16. Either the gage-plate may be made to fit closely between the inner posts 4 or the guides 14 dressed to closely embrace the upper portion of its shank 10, and the guide-screws 16 bear against the lower portion of the shank for holding the gage-plate level and in longitudinal alinement with the plates 6 or in a plane parallel thereto. This enables the vertical adjustment of the gage-plate to be changed as often as required by means of the adjusting-screw 11 without affecting the true horizontal position of the gage-plate. In order to stiffen the frame, the lugs 12 and 15 are preferably connected by a U-shaped flange 17, the upper part of which is spread to connect with the posts 4, as shown in Figs. 2 and 3. The shank 10 of the gage-plate is provided about centrally with a nut portion 18, having a screw-threaded opening for the reception of a binding-screw 21, which passes through a vertical elongated opening in a laterally-projecting lug 20 of the frame 1 in order to draw the shank 10 tightly against the frame 1 and hold the gage-plate 8 firmly in position. If desired, the nut 18 may consist of a separate piece instead of being made integral with the shank, in which event the nut will be cut away at opposite sides and allowed to project through the opening or slot in the shank and partially into the opening in the frame, thus increasing the thickness of that part of the nut which contains the threaded opening for the binding-screw, as illustrated in Fig. 6.

The opposite side of the implement is shown in the perspective view of Fig. 1, and the different positions of the file for jointing the points of the saw-teeth and for dressing the sides thereof are indicated by the dotted lines $a$ and $b$, respectively. The posts 5 are provided at their upper ends with laterally-projecting file-rests or gage-lugs 22. The lower sides of said projections form abutments or rests, against which the file bears, as shown in Fig. 1, when placed edgewise in the implement. The flange 3 extends upward along the edges of the frame, and file-rests 23 and 24 are formed thereon, against which the lower edge and inner side of the file will rest when placed flatwise in the tool. The rests 24 are somewhat inclined, as shown in Figs. 4, 5, and 6, so as to support the file at an angle corresponding with the set in the saw-teeth when the tool is turned upside down for dressing the sides of the saw-teeth points.

25 designates a slotted file-clamp, provided with file-rests 26 and 27 at its upper and lower ends, respectively, said rests projecting laterally from the body of the clamp and being adapted to engage the file for holding the same against the file-rests on the frame, as will be clearly understood from Fig. 1. The lower end of the clamp has a projection 28 extending into an opening 28' in the frame and is provided with a vertical screw-threaded opening in which is inserted an operating-screw 29, having a collar 30, which, together with the head of the screw, embraces the flange 3, which is provided with a centrally-located notch 31 to receive the shank of the screw, said notch preferably opening out at the opposite side of the frame from that on which the clamp is arranged. The lug 20 passes through the slot in the clamp 25 and is of the right thickness to prevent wabbling of the clamp under the head of the binding-screw 21, by which the clamp is held against the frame. The opposite sides of the lug 20 are also preferably beveled or chamfered to engage the correspondingly-beveled sides 32 of the opening in the file-clamp for the purposes of securing a snug and accurate fit. The projections 22 are of such length as to permit the tool to be used as a "set-gage" while the saw-teeth are being set, as illustrated in Fig. 4, the saw being indicated by the dotted line $c$.

The parts of the implement are assembled as follows: The adjusting-screw 11 and the guide-screws 16 are first inserted in their openings in the lugs 12 and 15. The screw 29 is then inserted in the lower end of the clamp 25 and introduced in the notch 31 of the frame, the clamp 25 being afterward brought into proper relation to the frame so as to bear snugly against the same and fit over the lug 20. The gage-plate 8 is then put into position between the inner posts 4, with its shank extending downward between the guides 14 and guide-screws 16. The binding-screw 21 is then inserted through the lug 20 and frame into the opening in the shank 10 or nut 18 and turned until the shank is drawn closely against the frame. The gage-plate 8 is then leveled by means of the guide-screws 16 and is independently adjusted vertically by the adjusting-screw 11. The gage-plate may be removed and replaced as often as necessary without disturbing the adjustment of the screw 11. When the parts are properly positioned, the screw 21 is tightened and the implement as a whole is ready for use for its several purposes.

Having thus described the invention, what is claimed as new, and desired to be secured by Letters Patent, is—

1. A saw-jointer comprising a frame, flanges or plates thereon to rest against the points of the saw-teeth, a gage-plate provided with a shank, means for adjusting said plate, and guide-screws bearing against the side edges of the shank by means of which the gage-plate may be leveled, substantially as described.

2. The combination with the frame of a saw-jointer and gage, of a gage-plate adjustable on the frame and provided with a shank, and having an integral nut portion, a binding-screw passing through the frame, and engaging said nut portion for holding the gage-plate rigidly to the frame, means for adjusting the gage-plate, and guide-screws for leveling the gage-plate, substantially as described.

3. The combination with the frame of a saw-jointer and gage, of an adjustable gage-plate provided with a shank, means associated with said shank for fixing the position of the gage-plate, a lug on the frame, and an adjusting-screw passing through said lug and operating against the inner or lower end of the shank of the gage-plate for moving the shank of the gage-plate longitudinally, substantially as described.

4. In a saw-jointer and gage, the combination, with the frame of the implement, of a file-clamp adjustable up and down, and a rotatable but longitudinally-immovable operating-screw having a threaded engagement with the file-clamp, substantially as and for the purpose specified.

5. In a combined saw-jointer, straight-edge and gage, the combination with the frame of the implement provided with a series of posts, the outer of which diverge to give an increased distance between the posts adjacent to the straight-edge, of integrally-formed plates supported by said posts and arranged in longitudinal alinement with each other to form a straight-edge with open spaces beneath through which the points of the saw-teeth may be viewed while gaging the rakers, substantially as described.

6. In a combined saw-jointer, straight-edge and gage, the combination with the frame, of laterally-projecting flanges forming rests for the saw-blade, and lateral gage-lugs of less projection than said flanges constituting set-gages against the extremities of which the saw-teeth are adapted to bear, substantially as and for the purpose specified.

7. In a combined saw-jointer and gage, the combination with the frame of the implement formed with a laterally-projecting lug having a vertically-elongated opening therethrough, of an adjustable file-clamp embracing said lug, an adjustable gage-plate arranged at the opposite side of the frame from the clamp and having an integral nut portion, and a binding-screw passing through the file-clamp, gage-plate and frame-lug, and adjustable up and down in the frame-lug, all combined and arranged substantially as set forth.

In testimony whereof I affix my signature in presence of two witnesses.

GUSTAF Y. ANDERSON.

Witnesses:
S. A. HAYNES,
W. G. PAXTON.